Nov. 21, 1933.                C. O. GUERNSEY                 1,935,844
                              SPRING SUSPENSION
                         Filed Dec. 14, 1931           2 Sheets-Sheet 1
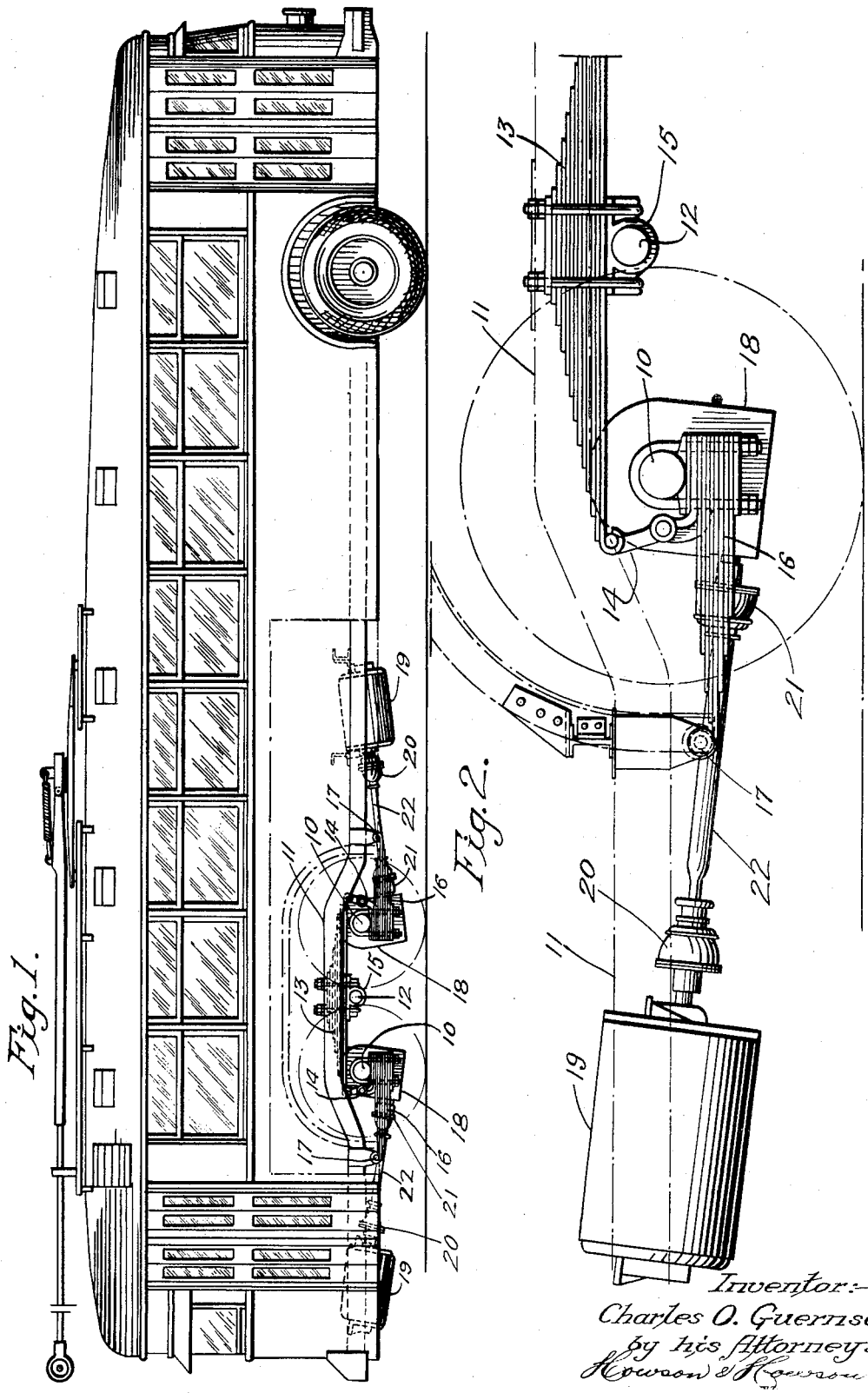
Inventor:—
Charles O. Guernsey
by his Attorneys
Howson & Howson Nov. 21, 1933.  C. O. GUERNSEY  1,935,844
SPRING SUSPENSION
Filed Dec. 14, 1931   2 Sheets-Sheet 2
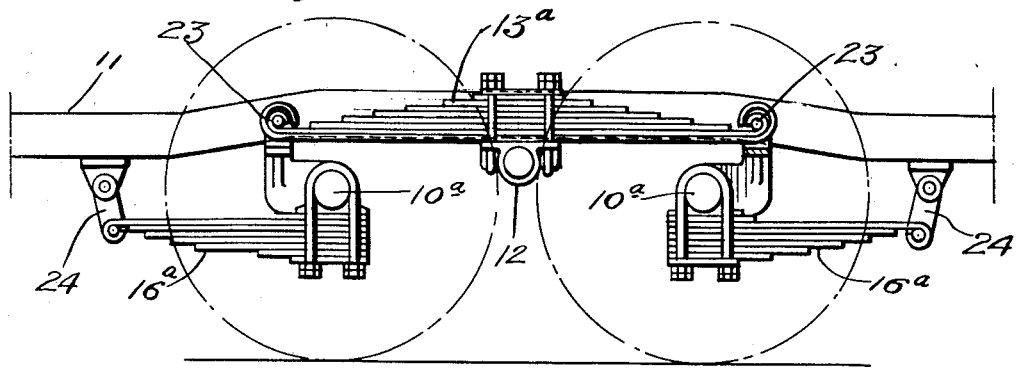
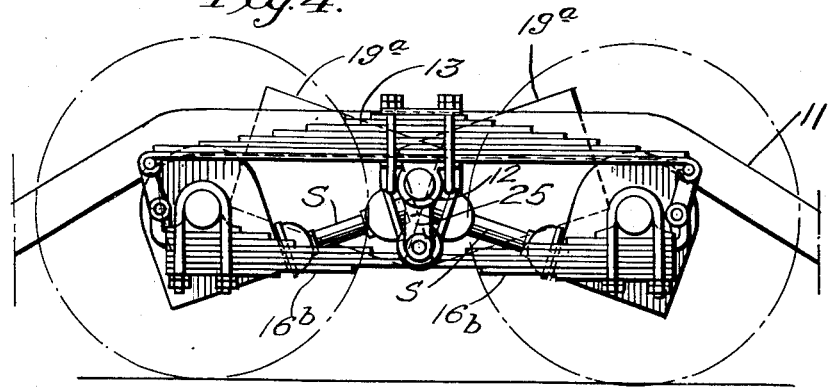
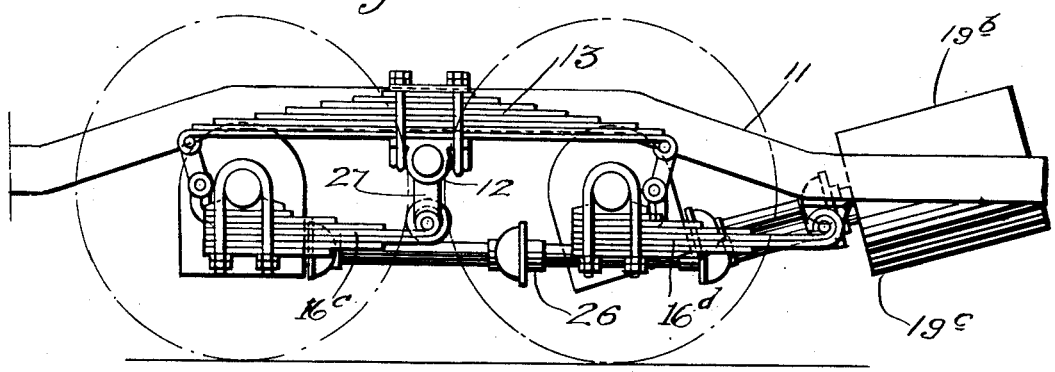
Inventor:
Charles O. Guernsey
by his Attorneys
Howson & Howson Patented Nov. 21, 1933

1,935,844

UNITED STATES PATENT OFFICE 1,935,844

SPRING SUSPENSION

Charles O. Guernsey, Philadelphia, Pa.

Application December 14, 1931
Serial No. 581,028

3 Claims. (Cl. 180—22)

This invention relates to a spring suspension for multiple drive axle vehicles, and more particularly to vehicles of this character which are operated by motors, though not necessarily limited to such use.

An important object of the present invention is the provision of a novel spring mounting for the driving axles of such vehicles permitting such driving axles to be placed in close proximity to one another while providing at the same time a relatively long riding or supporting spring, thus insuring better riding action while permitting the driving wheels to be placed in as close proximity to one another as is possible.

A further object of the invention is the provision of a flexible torque rod construction in connection with such driving axle arrangement thereby permitting the necessary movements of the axle without causing twisting strains on the axle housing.

A still further object of the invention is the provision of a construction of this character such that independent drives may be provided for the axles and that the universal joints connecting the driving medium and the axles may be subjected to a minimum angular displacement in operation.

These and other objects I attain by the construction shown in the accompanying drawings wherein, for the purpose of illustration, I have shown a preferred embodiment of my invention and wherein:

Fig. 1 is a side elevation of a bus employing a spring mounting in accordance with my invention;

Fig. 2 is an enlarged detail view showing the spring mounting.

Fig. 3 is a view similar to that of Fig. 2, illustrating a modified method of connecting the springs of the suspension;

Fig. 4 is a side elevation showing a modified arrangement of both the drive and the spring suspension; and Fig. 5 shows a further modification thereof.

Referring now more particularly to the drawings, and more particularly to Figs. 1 and 2 thereof, the numeral 10 designates driving axle housings arranged beneath the bus frame 11 and in relatively close proximity to one another. Between the axles 10 and above the same a transversely-extending support 12 is disposed the ends of which mount semi-elliptic springs 13 which extend longitudinally with respect to frame 11 and have their ends projected beyond the axle housings 10 and connected thereto by depending shackles 14. The mounting 15 connecting each spring 13 with the transverse mounting 12 is of such character that the spring is pivotally mounted upon the support although any suitable arrangement may be provided which will permit the springs 13 to pivot upon their transverse centers.

Rigidly secured to each end of each axle housing 10 is a longitudinally-extending quarter elliptic spring 16 each spring being at present shown as projecting outwardly and longitudinally from its associated axle and having its forward end pivoted to the frame 11 at 17 but held against lateral play with relation thereto. Each axle housing 10 includes the usual differential housing 18 and associated with each axle and disposed at that side of the axles to which the associated torque springs 16 extend is a driving motor 19 the drive shaft of which is connected through universal joints 20 and 21 and an intermediate shaft section 22 with the input shaft of the differential drive. The pivotal point 17 about which springs 16 rotate is preferably located approximately centrally as regards the length of the intermediate shaft 22 with the result that as the axle housings 10 rise and fall the angular displacement in universal joints 20 and 21 is substantially uniformly distributed between these joints, thus eliminating impractical driving angles while at the same time permitting the motors 19 to be arranged in fairly close proximity to the axles with which they are associated. It will be noted that the spring 13 carries the load and serves to distribute the load between the driving axles without regard to displacement of the wheels due to engagement with obstructions. The springs 16 act as torque and radius rods taking care of driving and braking torque and permitting either end of either axle to rise independently of the other end thereof by reason of the fact that their flexibility eliminates the twisting strains to which the axle would be otherwise subjected when such a displacement of the wheels threw the torque arms out of parallel with one another. Springs 16, furthermore, assume the driving function. Attention is directed to the fact that springs 13 will exert a rotative torque upon the axle housings 10 and that this torque will be taken up by the springs 16, these springs thus assuming a small portion of the load.

The structure of the arrangement hereinbefore described is capable of considerable modification. Obviously, any of the ordinary shackle substitutes could be provided in lieu of the shackles 14, and as illustrated in Fig. 3, the spring 13—a instead of being shackle-connected to the drive axles indicated at 10—a may be connected thereto through a pivotal connection 23. In this case, the pivotal connection employed for the torque springs 16—a would be substituted for by a shackle connection 24 with the result that the spring 13—a would now assume the driving function of the suspension.

In the arrangement shown in Fig. 4, the type of spring connection between axles 10 and spring 13—b shown in Fig. 1 is employed. In this construction, however, the drive motors 19—a, while each arranged adjacent one of the axles 10, have their drive shafts S in driving connection with the remote axle. In such a construction the springs 16—b of adjacent axles will extend toward one another, being in the present instance shown as pivoted upon a common pivot 25.

In the form of invention shown in Fig. 5, the driving motors 19—b and 19—c are both arranged outwardly of one of the axles, the motor 19—b being connected to the adjacent axle while the motor 19—c is connected to the remote axle through a universal jointed shaft assembly 26 which extends beneath and has one section thereof supported by the adjacent axle. In this construction the spring 16—c of the remote axle will project toward the other axle of the pair while the spring 16—d of the adjacent axle will project longitudinally of the frame toward the motors 19—b, 19—c and may be pivotally connected directly with the frame. In the case of the springs 16—b of the arrangement of Fig. 4 and the spring 16—c of the remote axle of Fig. 5, the pivotal connection for spring 16 may comprise a depending support 27 carried by the support 12 of spring 13.

It will, of course, be obvious that in some situations instead of a plurality of driving axles it is desirable to employ one driving and one "dead" axle. It will also be obvious that the spring mounting and torque connections can be employed in such a situation or in a situation where two "dead" axles are employed with equal facility to the illustrated structure wherein two "live" axles are employed. It will, therefore, be understood that the phrase "wheel mounting members" as employed in the following claims includes "dead" as well as "live" axles.

Since the structure described and the various modifications thereof noted hereinbefore constitute but examples of possible rearrangements, I do not wish to be understood as limiting myself thereto except as hereinafter claimed.

I claim:

1. In a multiple driving axle automotive vehicle, a frame, parallel axle housings extending beneath the frame in close proximity to one another, a spring pivoted to the frame at each side thereof at a point intermediate the axle housings and having its ends projecting over the axle housings, connections between said spring ends and the ends of the adjacent axle housings, a spring rigidly secured to each end of each axle housing and projecting outwardly longitudinally of the frame from the axle housing, pivotal connections between the outer ends of the last-named springs and the frame, a motor disposed outwardly of each axle housing, means for driving the axle disposed in the adjacent housing from said motor including universal joints disposed adjacent the motor and the axle housing, and an intermediate shaft, the pivotal connections between the last-named springs of each axle and the frame being disposed in a plane transverse to the frame approximately centrally intersecting the associated intermediate shaft.

2. In a multiple driving axle automotive vehicle a frame, parallel axle housings extending beneath the frame in close proximity to one another, spring means extending between said axle housings and the frame to support the frame from the housings, a spring rigidly secured to each end of each axle housing and projecting outwardly longitudinally from the axle housing, pivotal connections between the outer ends of the last-named springs and the frame, a motor disposed outwardly of each axle housing, means for driving the axle disposed in the adjacent housing from said motors including universal joints disposed adjacent each motor and the associated axle housing and an intermediate shaft, the pivotal connections between the last-named springs of each axle and the frame being disposed in a plane transverse to the frame approximately centrally intersecting the associated intermediate shaft.

3. In a multiple driving axle automotive vehicle, a frame, parallel axle housings extending beneath the frame, a longitudinally-extending spring pivoted to the frame at each side of the frame at a point intermediate the axle housings and having its ends projecting over the axle housings, connections between said spring ends and the adjacent axle housings, a spring rigidly secured to each end of each axle housing and projecting longitudinally of the frame from the axle housing, connections between the outer ends of the last-named springs and the frame, a drive motor associated with each axle and spaced longitudinally of the frame therefrom, means for driving the axle disposed in the adjacent housing from said motor including universal joints disposed adjacent the motor and axle housing and an intermediate shaft, the connections between the last-named springs of each axle and the frame being disposed in a plane transverse to the frame approximately centrally intersecting the associated intermediate shaft.

CHARLES O. GUERNSEY.